US011289742B2

(12) United States Patent
Lippman et al.

(10) Patent No.: US 11,289,742 B2
(45) Date of Patent: Mar. 29, 2022

(54) METHOD AND SYSTEM FOR DYNAMIC BATTERY CHARGE RATE ADAPTATION

(71) Applicant: ZEBRA TECHNOLOGIES CORPORATION, Lincolnshire, IL (US)

(72) Inventors: Devan J. Lippman, Cumberland, RI (US); Francisco Faria, Lincoln, RI (US)

(73) Assignee: Zebra Technologies Corporation, Lincolnshire, IL (US)

(*) Notice: Subject to any disclaimer, the term of this patent is extended or adjusted under 35 U.S.C. 154(b) by 83 days.

(21) Appl. No.: 16/456,872

(22) Filed: Jun. 28, 2019

(65) Prior Publication Data
US 2020/0412130 A1    Dec. 31, 2020

(51) Int. Cl.
*H01M 10/44* (2006.01)
*H02J 7/00* (2006.01)
*H01M 10/48* (2006.01)

(52) U.S. Cl.
CPC ........ *H01M 10/443* (2013.01); *H02J 7/007* (2013.01); *H02J 7/007194* (2020.01); *H01M 10/486* (2013.01)

(58) Field of Classification Search
CPC .... H02J 7/007; H02J 7/0021; H02J 7/007194; H01M 10/443
USPC ......................................... 320/134, 150, 153
See application file for complete search history.

(56) References Cited

U.S. PATENT DOCUMENTS

| 5,519,303 | A  | * | 5/1996  | Goedken ............. H02J 7/00038 320/150 |
| 6,665,801 | B1 |   | 12/2003 | Weiss |
| 2008/0297112 | A1 |   | 12/2008 | Cordes et al. |
| 2012/0297230 | A1 |   | 11/2012 | Cordes et al. |
| 2015/0054462 | A1 | * | 2/2015  | Weidinger ........ H02J 7/007194 320/109 |
| 2016/0226280 | A1 |   | 8/2016  | Noor et al. |
| 2019/0058336 | A1 | * | 2/2019  | Thompson ............. B60L 58/12 |

* cited by examiner

*Primary Examiner* — Edward Tso
*Assistant Examiner* — Aaron Piggush

(57) ABSTRACT

A method of charging a battery in an electronic device includes: supplying electrical power to the battery at a charge rate equal; determining if a battery temperature exceeds an adaptive temperature threshold; responsive to the battery temperature exceeding the adaptive temperature threshold: determining a rate of change of the battery temperature; obtaining a charge rate adjustment based on the rate of change; and modifying the charge rate by the charge rate adjustment.

16 Claims, 4 Drawing Sheets

METHOD AND SYSTEM FOR DYNAMIC BATTERY CHARGE RATE ADAPTATION

BACKGROUND

The rate at which a rechargeable battery is recharged can be accelerated by increasing the current and/or voltage supplied to the battery. However, an excessively high charge rate can damage the battery, e.g. by overheating the battery. The need to balance charging speed against a thermal tolerance of the battery can lead to the use of charging profiles that are overly conservative, resulting in long charge times, or to the use of charging profiles that are overly aggressive, resulting in reduced battery lifespan.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
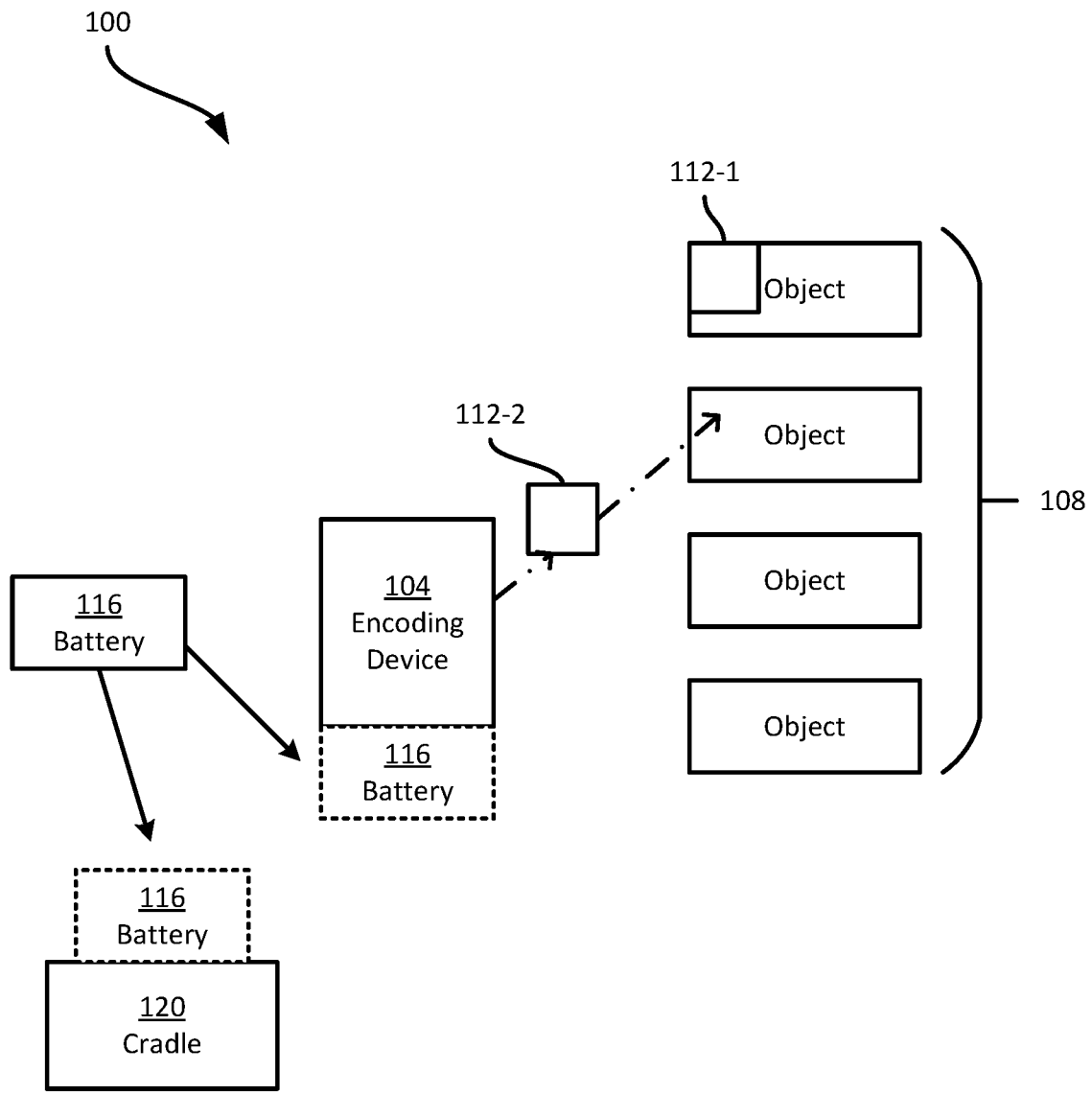
FIG. 1 is a block diagram of a battery charging system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of charging a battery in an electronic device, the method comprising: supplying electrical power to the battery at a charge rate equal; determining if a battery temperature exceeds an adaptive temperature threshold; responsive to the battery temperature exceeding the adaptive temperature threshold: determining a rate of change of the battery temperature; obtaining a charge rate adjustment based on the rate of change; and modifying the charge rate by the charge rate adjustment.

Additional examples disclosed herein are directed to an electronic device, comprising: a power supply; an interface configured to connect to a battery; a charge controller connected to the power supply and the interface, the charge controller configured to: control the power supply to supply electrical power to the battery via the interface at a charge rate; determine if a battery temperature exceeds an adaptive temperature threshold; responsive to the battery temperature exceeding the adaptive temperature threshold: determine a rate of change of the battery temperature; obtain a charge rate adjustment based on the rate of change; and modify the charge rate by the charge rate adjustment.

FIG. 1 depicts an example system 100 constructed in accordance with the teachings of this disclosure. The system 100 includes at least one encoding device (also referred to herein simply as a device) 104. The encoding device 104 is deployed within any suitable environment or set of environments, including warehouses, production lines, retail environments, and the like, to perform encoding tasks with respect to sets of objects such as the set of objects 108 shown in FIG. 1. The nature of the objects 108 varies with the environment (or environments) in which the device 104 is deployed. For example, the objects 108 can include boxes, pallets and the like in a warehouse. The encoding tasks performed by the device 104, in general, associate data with one or more of the objects 108. For example, as shown in FIG. 1, the device 104 is implemented as a label printer, and is therefore configured to print labels 112 to be affixed to an object 108. Example labels 112 illustrated in FIG. 1 include a label 112-1 shown as having already been placed on an object 108, and a further label 112-2 shown as having been generated (e.g. printed) by the device 104 for placement on another object 108.

The labels 112 are, in some examples, labels bearing any one of, or any suitable combination of, barcodes, product names, product numbers, serial numbers, quantities, shipping information (e.g. destination mailing addresses), stock keeping numbers, production information (e.g. lot numbers, manufacturer codes, and production dates), and the like. In other examples, the encoding tasks performed by the device 104 include writing data to radio frequency identification (RFID) tags previously placed on the objects 108. In further examples, the device 104 is configured to perform both label impression and RFID tag encoding (e.g., the labels printed by the device 104 may include RFID tags embedded therein, which the device 104 writes data to substantially simultaneously with label impression).

In some examples, the device 104 is employed to perform tasks other than the encoding tasks mentioned above. For example, the device 104 may be a handheld tool such as a nail-gun, a drill or the like (e.g. for use on a production line), a mobile device such as a mobile computer, a smartphone, a barcode scanner, a handheld RFID reader and the like. More generally, the device 104 is deployed to perform a set of tasks that consume energy.

The energy required to perform the above-mentioned tasks is provided by a rechargeable battery (otherwise called a battery) 116. The battery 116, in the present example, is removably connectable with the device 104 to supply power to the device 104. Typically, the battery 116 and the device 104 are interchangeable, such that the battery 116 can be connected to other devices (not shown) for a given operational period, and/or such that other batteries (not shown) can be employed to power the device 104. The battery 116 must be recharged periodically, either directly by the device 104 itself (e.g. when the device 104 is connected to an external power source such as a wall outlet), or by a charging cradle 120.

In other examples, the battery 116 is integrated with the device 104 rather than being readily removable. That is, the battery 116 can be coupled with the device 104 in such a manner that removal of the battery 116 from the device 104 is difficult or impossible without damaging one or both of the battery 116 and the device 104. In such examples, the charging cradle 120 is omitted, and charging of the battery 116 is performed solely by the device 104.

To charge the battery 116, the device 104 or the charging cradle 120 supplies electrical power to the battery 116 from an external power source. As will be discussed below, the device 104 and the charging cradle 120 are configured to monitor an internal temperature of the battery 116 during charging, and to dynamically adapt a rate at which electrical power is supplied to the battery 116 according to a metric derived from the monitored temperature. Before discussing the above-mentioned functionality, certain internal components of the device 104 and the charging cradle 120 will be described in connection with FIGS. 2A and 2B.

Figure 2A:
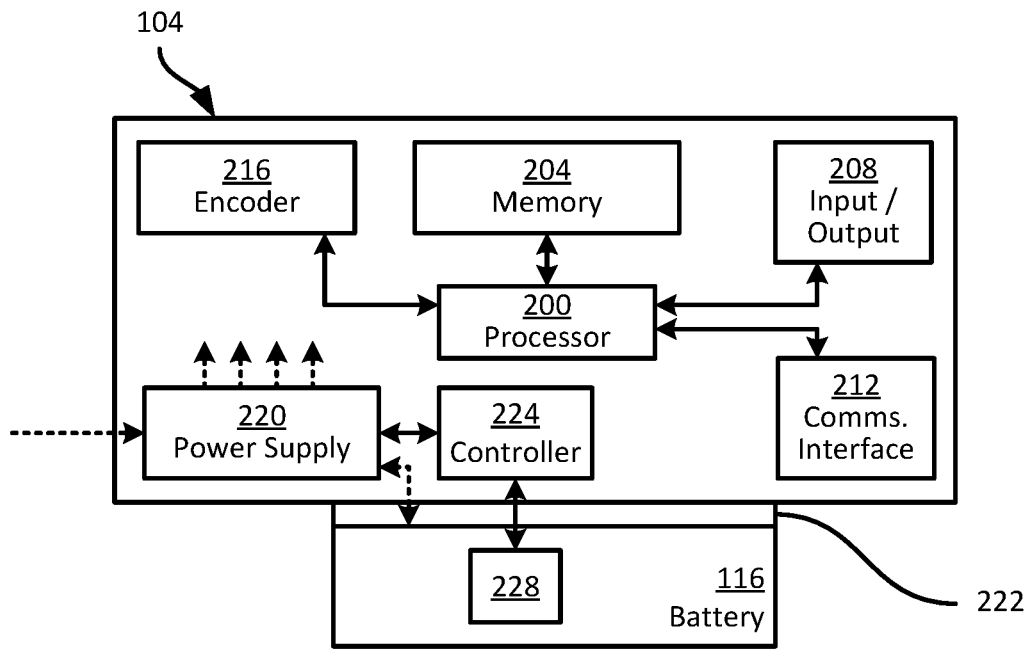
FIG. 2A is a block diagram of certain internal components of the encoding device of FIG. 1.

FIG. 2A illustrates certain components of the device 104, with the battery 116 connected thereto. The device 104, as shown in FIG. 2A, includes a central processing unit (CPU), also referred to as a processor 200 interconnected with a non-transitory computer readable storage medium, such as a memory 204. The memory 204 includes any suitable combination of volatile memory (e.g. Random Access Memory (RAM)) and non-volatile memory (e.g. read only memory (ROM), Electrically Erasable Programmable Read Only Memory (EEPROM), flash). The processor 200 and the memory 204 each comprise one or more integrated circuits (ICs).

The device 104 also includes at least one input device, and at least one output device, illustrated in FIG. 2A as an input/output assembly 208 interconnected with the processor 200. The input(s) include any suitable one of, or any suitable combination of, a touch screen, a keypad, a trigger (e.g. to initiate the performance of an encoding task), and the like. The output(s) include any suitable one of, or any suitable combination of, a display (e.g., integrated with the above-mentioned touch screen), a speaker, and the like. The input/output assembly 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices. The communications interface 212 includes any suitable hardware (e.g. transmitters, receivers, network interface controllers and the like) allowing the device 104 to communicate with such other devices.

The device 104 also includes an encoder assembly 216 in the present example. The encoder assembly 216 (also referred to simply as the encoder 216) is configured to perform one or more of the above-mentioned encoding tasks. Thus, in some examples, the encoder 216 includes a label printer comprising a supply of media (e.g., a roll of blank labels, receipt paper, tags, wristbands, RFID tags, magnetic stripe cards), a print head and supporting components for feeding the media to an exit defined in a housing (not shown) of the device 104 via the print head for impression. In other examples, the encoder 216 includes a RFID writer instead of, or in addition to, the above-mentioned label printer. In further examples, the encoder 216 is replaced by, or supplemented with, another functional assembly, such as a motor for a drill or the like, a decoder such as a barcode reader, an RFID reader, or the like.

The components of the device 104 are interconnected by communication buses (not shown). The device 104 also includes a power supply 220, which routes electrical power to the components of the device 104 via one or more power buses (shown partially, in dashed lines). The power supply 220 routes such electrical power either from the battery 116, when the battery 116 is connected to the device 104 via an interface 222 (e.g. a set of structures configured to retain the battery 116, exchange data between the battery 116 and the device 104, and connect leads of the battery 116 with electrical terminals of the device 104), or from an external power source (e.g. a wall outlet) when the battery 116 is not present. Further, the power supply 220 can route electrical power both from and to the battery 116, either discharging the battery 116 to power the components of the device 104, or charging the battery 116 from the external power source mentioned above.

The device 104 also includes a charge controller 224 connected with the power supply 220. In some examples, the charge controller 224 is integrated with the power supply 220. In further examples, the charge controller 224 is implemented by the processor 200 (e.g. via the execution of a instructions stored in the memory 204). As will be discussed below, the charge controller 224 (also referred to simply as the controller 224) performs various actions for determining a charge rate at which to supply electrical power to the battery 116.

The battery 116 itself, as shown in FIG. 2A, includes a storage element 228 (e.g. a memory circuit, a microcontroller, or the like) that stores various operational parameters of the battery 116, such as a maximum operating temperature, parameters defining a maximum charge rate (e.g. maximum voltage and/or current tolerance) and the like. In other examples, the storage element 228 may be omitted and the above parameters may instead by stored externally to the battery 116 (e.g. in the memory 204, or in a memory component of the charging cradle 120). The battery 116 also includes a temperature sensor that continuously monitors an internal temperature of the battery, for reporting to the controller 224 via the storage element 228 and the interface 222.

Figure 2B:
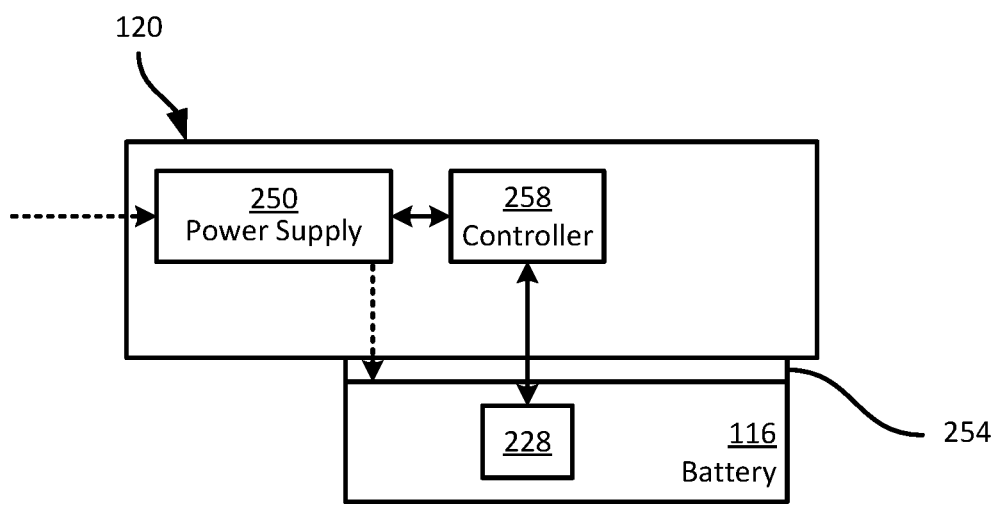
FIG. 2B is a block diagram of certain internal components of the charging cradle of FIG. 1.

Turning to FIG. 2B, certain components of the charging cradle 120 are shown. The charging cradle 120 includes a power supply 250 that receives electrical power from an external source (e.g. a wall outlet) and supplies power to the battery 116 when the battery 116 is connected to an interface 254 of the charging cradle 120. The charging cradle 120 also includes a charge controller 258, which is as described above in connection with the controller 224 of the device 104. The functionality of the charge controllers 224 and 258 will be described below with reference to the controller 224 only, however it will be understood that such functionality can also be implemented by the controller 258 of the charging cradle 120.

Figure 3:
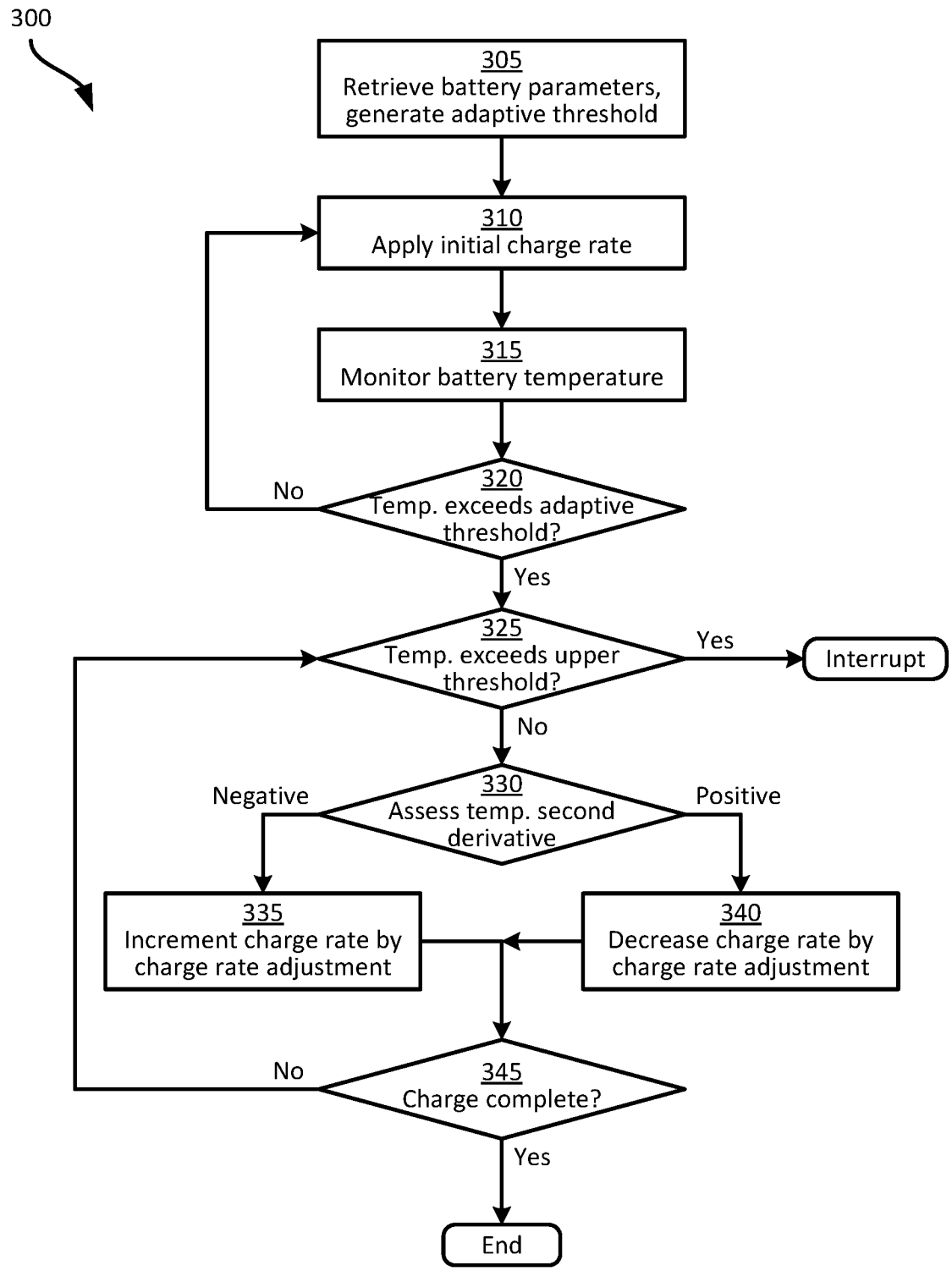
FIG. 3 is a flow chart of a method of dynamic battery charge rate adaptation.

Turning to FIG. 3, a method 300 of dynamic battery charge rate adaptation is illustrated. As noted above, the method 300 will be discussed in connection with its performance by the device 104 (and more specifically by the controller 224). In other examples, however, the method 300 can also be performed by the controller 258 of the charging cradle 120.

The performance of the method 300 can be initiated in response to the battery 116 being connected to the interface 222, and to the availability of an external power source (e.g. when the device 104 is connected to an electrical adapter or the like).

Beginning at block 305, the controller 224 retrieves battery parameters from the storage element 228 via the interface 222. The parameters retrieved at block 305 include a temperature threshold representing a maximum operating temperature of the battery 116. The parameters can also include parameters, such as voltage and current tolerances, that define a maximum charge rate for the battery 116.

The controller 224 determines, based on the parameters retrieved at block 350, an adaptive temperature threshold and an initial charge rate for the battery 116. The adaptive temperature threshold is a temperature above which the adaptive charge rate adjustment discussed in detail below is implemented. The adaptive temperature threshold is determined by the controller 224 by retrieving a first predefined buffer stored at the controller 224 or in the memory 204 and subtracting the buffer from the temperature threshold retrieved from the battery. For example, the temperature threshold from the battery may be 45 degrees Celsius, and the first predefined buffer may be 5 degrees. Therefore, the adaptive temperature threshold determined at block 305 is 40 degrees Celsius.

The controller 224 can also determine, at block 305, an upper threshold that is either equal to the maximum threshold from the battery 116 (i.e. 45 degrees in the example above), or that is equal to the maximum threshold subtracted by a second predefined buffer, smaller than the first predefined buffer. For example, the second predefined buffer can be 2 degrees in the above example, such that the upper threshold is 43 degrees. As will be seen below, charging of the battery 116 is interrupted if the upper threshold is exceeded, to prevent damage to the battery 116.

The charge rate is determined at block 305 based on the voltage and current tolerances mentioned above, as retrieved from the battery 116. In the present example, the charge rate is a maximum charge rate, corresponding to the greatest rate of electrical power tolerated by the battery 116, as indicated by the parameters retrieved from the battery 116.

At block 310 the controller 224 applies the charge rate to the battery 116. That is, the controller 224 controls the power supply 220 to supply electrical power to the battery 116 at the charge rate. At block 315, simultaneously with power delivery to the battery 116, the controller 224 monitors an internal temperature of the battery 116. As noted above, the battery 116 includes an internal temperature sensor, and temperature measurements are collected and transmitted to the controller 224 (or stored in the storage element 228 for retrieval by the controller 224) at a predetermined frequency (e.g. one measurement per second).

As will be apparent to those skilled in the art, the application of the charge rate, which is at or near the maximum tolerable charge rate of the battery 116, typically increases the internal temperature of the battery 116. The charge rate may also increase the temperature of the power supply 220 and charge controller 224 when the battery 116 is connected to the device 104, or the temperature of the power supply 250 and charge controller 258 when the battery 116 is connected to the charging cradle 120. At block 320, the controller 224 determines whether the internal temperature from block 315 exceeds the adaptive temperature threshold noted above. The performance of block 315 can be repeated for every temperature measurement obtained from the battery 116, or at any other suitable predetermined frequency (e.g. once every five seconds).

When the determination at block 320 is negative, the controller 224 continues supplying power (via the power supply 220) to the battery 116 at the charge rate. When the determination at block 320 is affirmative, however, indicating that the internal temperature of the battery 116 has exceed the adaptive temperature threshold (e.g. 40 degrees Celsius, in the example above), the controller 224 proceeds to block 325 to begin implementing dynamic charge rate adjustment.

At block 325, the controller 224 determines whether the current internal temperature of the battery 116 exceeds the upper threshold mentioned above. When the determination at block 325 is affirmative, an interrupt routine is executed, e.g. by reducing the charge rate to a predefined minimum (e.g. 10%), or ceasing charging altogether. The controller 224 can resume charging, e.g. returning to the start of the method 300 or returning to the adaptive mode, when the temperature of the battery 116 returns below a predetermined lower threshold (e.g. determined by subtracting the second predefined buffer, larger than the first predefined buffer, from the maximum operating temperature retrieved from the battery 116 at block 305).

When the determination at block 325 is negative, the controller 224 proceeds to block 330. At block 330 the controller 224 determines the second order rate of change (i.e. the second derivative) of the internal temperature of the battery 116. The second derivative of the temperature can be determined over any suitable preceding time period. For example, the second derivative may be determined for the time period represented by the current temperature sample and the immediately preceding temperature sample. In other examples, the second derivative may be determined for the time period represented by a plurality of preceding samples (e.g. the preceding 5 seconds of temperature measurements).

Depending on the sign of the second derivative determined at block 330, the controller 224 either increments or decrements the charge rate by a charge rate adjustment. Specifically, when the second derivative is positive, indicating that the internal temperature of the battery 116 accelerated over the assessed time period, the controller 224 decrements the charge rate by the charge rate adjustment at block 340. When, on the other hand, the second derivative is negative, indicating that the internal temperature of the battery 116 decelerated over the assessed time period, the controller 224 increments the charge rate by the charge rate adjustment at block 335.

The charge rate adjustment itself can be determined according to various mechanisms. In the present example, the charge rate adjustment is determined by the controller based on the charge rate and a preceding charge rate. Specifically, the charge rate adjustment is equal to one half of the previous adjustment (i.e. one half of the difference between the charge rate and the preceding charge rate). Examples of charge rates will be discussed below in connection with FIG. 4.

As will be apparent from the discussion above, the controller 224 does not take a separate action for a second derivative of zero (indicating a constant increase or decrease in battery temperature over the assessed time period). Instead, null second derivatives are handled by the controller 224 as positive second derivatives, to reduce the likelihood of maintaining a constant increasing temperature in the battery 116.

Following adjustment of the charge rate, the controller 224 proceeds to block 345, at which the controller 224 determines whether charging is complete. The determination at block 345 is performed according to any suitable mechanism, examples of which will occur to those skilled in the art. For example, the controller 224 can maintain an updated representation of the current capacity of the battery 116, based on data reported from the battery 116. When the current capacity exceeds a threshold (e.g. 95%), the determination at block 345 may be affirmative, and performance of the method 300 ends. In other examples, following an affirmative determination at block 345, the method 300 does not end, but rather the adaptive charging defined by blocks 330 to 340 ends, and a predetermined charging profile is applied to the battery 116 to complete charging.

When the determination at block 345 is negative, the controller 224 returns to block 325 to continue monitoring the second derivative of the monitored internal temperature of the battery 116.

Figure 4:
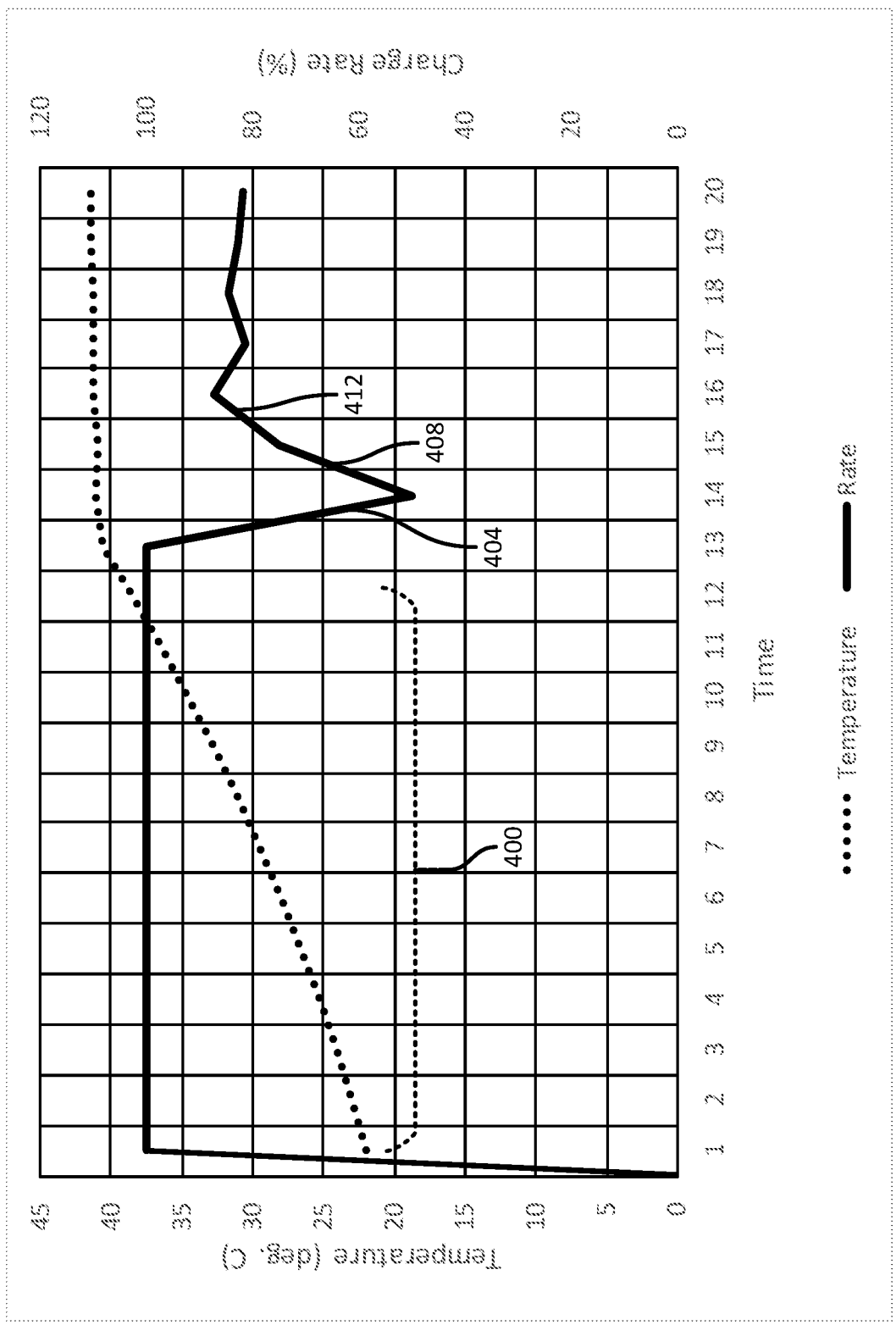
FIG. 4 is a chart illustrating example battery temperatures and charge rates during a performance of the method of FIG. 3.

Referring now to FIG. 4, an example performance of the method 300 is illustrated by a series of temperature measurements (in dashed lines) and a series of charge rates supplied by the controller 224 (in solid lines). As seen in FIG. 4, the battery 116 begins at an internal temperature of 22 degrees (e.g. ambient temperature), and at block 310 the controller applies a charge rate equal to the maximum charge rate tolerated by the battery 116. In response to the application of the maximum charge rate, the battery temperature rises throughout the period 400. In addition, the temperature does not rise linearly, but rather accelerates. That is, both the first and second order rates of change of the battery temperature are positive during the period 400. However, the internal battery temperature does not exceed the example adaptive temperature threshold of 40 degrees mentioned above, and the determination at block 320 is therefore negative throughout the period 400.

At the thirteenth second, the internal temperature of the battery 116 exceeds the above-mentioned example adaptive temperature threshold of 40 degrees. Therefore, the determination at block 320 is affirmative, and the controller 224 adjusts the charge rate according to the sign of the second derivative of the battery temperature. As noted above, the second derivative is positive, and the charge rate is therefore decremented at block 340. The charge rate adjustment is one half of the previous adjustment. When the adaptive mode is first enabled, the only preceding adjustment is the adjustment from a charge rate of zero to the maximum charge rate (i.e. 100%). The adjustment at the thirteenth second is therefore an adjustment of 50%, and at block 340 the charge rate is reduced by 50%, as indicated at 404.

Responsive to the reduction of the charge rate, between the thirteenth and fourteenth seconds the battery temperature continues to increase, but the increase is smaller than the increase between the twelfth and thirteenth seconds. That is, the second derivative of the battery temperature is negative. The controller 224 therefore increments the charge rate at block 335. The charge rate adjustment in this instance is one half of the previous adjustment (i.e. 25% in the present example). Thus, the charge rate is increased to 75% of the maximum at 408.

Following the increase of the charge rate, the battery temperature continues to decelerate, and in fact decreases from the fourteenth to fifteenth seconds. That is, the second derivative remains negative, and the charge rate is again increased at block 335 (by a charge rate adjustment of 12.5%), as shown at 412. The above procedure is repeated, halving the charge rate adjustment with each performance of block 330 (and either of blocks 335 and 340). As seen in FIG. 4, the internal battery temperature therefore stabilizes above the adaptive temperature threshold but below the upper threshold (e.g. of 43 degrees).

Variations to the above systems and methods are contemplated. For example, in other embodiments the first derivative of battery temperature can be assessed at block 330 rather than the second derivative. In such embodiments, the charge controller 224 or 258 proceeds to block 335 when the first derivative is negative, and to block 340 when the first derivative is positive, as described above. In further embodiments, the internal temperature of the battery 116 can be employed directly to adjust the charge rate, for example by implementing one or more additional adjustment thresholds between the adaptive threshold and the upper threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of charging a battery in an electronic device, the method comprising:
   supplying electrical power to the battery at a charge rate;
   determining if a battery temperature exceeds an adaptive temperature threshold;
   responsive to the battery temperature exceeding the adaptive temperature threshold:
     determining a rate of change of the battery temperature;
     obtaining a charge rate adjustment based on the rate of change;
     modifying the charge rate by the charge rate adjustment; and
   wherein the rate of change of the battery temperature is a second order rate of change, and wherein modifying the charge rate by the charge rate adjustment includes incrementing or decrementing the charge rate according to a sign of the second order rate of change.

2. The method of claim 1, further comprising retrieving maximum operating parameters from the battery, wherein an initial value for the charge rate is generated based on the maximum operating parameters.

3. The method of claim 1, further comprising retrieving a maximum operating temperature from the battery, wherein a value for the adaptive temperature threshold is generated based on the maximum operating temperature.

4. The method of claim 3, wherein generating the adaptive temperature threshold comprises subtracting a first predefined buffer from the maximum operating temperature.

5. The method of claim 4, further comprising:
   determining whether the battery temperature exceeds an upper threshold; and
   when the battery temperature exceeds the upper threshold, interrupting charging of the battery.

6. The method of claim 5, further comprising:
   generating the upper threshold based on the maximum operating temperature.

7. The method of claim 6, wherein generating the upper threshold includes subtracting a second predefined buffer from the maximum operating temperature, wherein the second predefined buffer is smaller than the first predefined buffer.

8. The method of claim 1, wherein the electronic device is one of an encoding device and a charging cradle.

9. An electronic device, comprising:
   a power supply;
   an interface configured to connect to a battery;
   a charge controller connected to the power supply and the interface, the charge controller configured to:
     control the power supply to supply electrical power to the battery via the interface at a charge rate;
     determine if a battery temperature exceeds an adaptive temperature threshold;
     responsive to the battery temperature exceeding the adaptive temperature threshold:
       determine a rate of change of the battery temperature;
       obtain a charge rate adjustment based on the rate of change;
       modify the charge rate by the charge rate adjustment; and
     wherein the rate of change of the battery temperature is a second order rate of change, and wherein the charge controller is further configured, in order to modify the charge rate by the charge rate adjustment, to increment or decrement the charge rate according to a sign of the second order rate of change.

10. The electronic device of claim 9, wherein the charge controller is further configured to retrieve maximum operating parameters from the battery, wherein an initial value for the charge rate is generated based on the maximum operating parameters.

11. The electronic device of claim 9, wherein the charge controller is further configured to retrieve a maximum operating temperature from the battery, wherein a value for the adaptive temperature threshold is generated based on the maximum operating temperature.

12. The electronic device of claim 11, wherein the charge controller is further configured, in order to generate the adaptive temperature threshold, to subtract a first predefined buffer from the maximum operating temperature.

13. The electronic device of claim 12, wherein the charge controller is further configured to:
   determine whether the battery temperature exceeds an upper threshold; and
   when the battery temperature exceeds the upper threshold, interrupt charging of the battery.

14. The electronic device of claim 13, wherein the charge controller is further configured to:
   generate the upper threshold based on the maximum operating temperature.

15. The electronic device of claim 14, wherein the charge controller is further configured, in order to generate the upper threshold, to subtract a second predefined buffer from the maximum operating temperature, wherein the second predefined buffer is smaller than the first predefined buffer.

16. The electronic device of claim 9, comprising one of an encoding device and a charging cradle.

* * * * *